United States Patent [19]

Montreuil et al.

[11] Patent Number: 5,279,997

[45] Date of Patent: Jan. 18, 1994

[54] SELECTIVE REDUCTION OF NO$_x$

[75] Inventors: Clifford N. Montreuil, Dearborn; Mordecai Shelef, Birmingham, both of Mich.

[73] Assignee: Ford Motor Company, Dearborn, Mich.

[21] Appl. No.: 772,298

[22] Filed: Oct. 7, 1991

[51] Int. Cl.$^5$ .................. B01J 29/04; B01J 29/30; B01D 53/36

[52] U.S. Cl. ................... 502/62; 423/213.2; 423/239.2

[58] Field of Search .............. 502/60, 62; 423/213.2, 423/239

[56] References Cited

U.S. PATENT DOCUMENTS

| | | | |
|---|---|---|---|
| 3,181,928 | 5/1965 | Frilette et al. | 423/213.2 |
| 4,934,142 | 6/1990 | Hayashi et al. | 60/297 |
| 5,041,270 | 8/1991 | Fujitani et al. | 423/213.2 |

FOREIGN PATENT DOCUMENTS

| | | | |
|---|---|---|---|
| 2513942 | 9/1976 | Fed. Rep. of Germany | 423/213.2 |
| 3-52644 | 3/1991 | Japan | |

OTHER PUBLICATIONS

Bosch et al, "Catalysis Today", vol. 2 (4), 1987, pp. 369-531.

Taylor, "Automobile Catalyst Converters", Springer, Berlin, 1984, V5 pp. 1-51.

Iwamoto et al, Applied Catalysis, vol. 69, L 15-19, 1991.

Sato et al, Applied Catalysis, vol. 70, L 1-5, 1991.

Primary Examiner—Carl F. Dees
Attorney, Agent, or Firm—Joseph W. Malleck; Roger L. May

[57] ABSTRACT

A catalyst system for the selective reduction of gaseous NO$_x$ in the presence of excess oxygen, having a copper-containing ZSM5 zeolite to which a NO$_x$-containing gas is exposed, and means for introducing a metered volume of finely dispersed, water soluble, oxygen-containing organic compound (alcohol, aldehyde, ketone, ether) into the NO$_x$-containing gas prior to exposure to the Cu-ZSM5 zeolite.

Also, a method of treating automotive exhaust gas emissions, having an excess of oxygen, by the steps of: (a) introducing a water soluble, oxygenated organic compound (steam/oxygenate mixture) into the exhaust gas emissions as a reductant and at a location closely adjacent the source of the exhaust gas generation (in an appropriate amount with respect to the NO$_x$); (b) substantially immediately exposing the reductant/emission mixture to a transition metal-exchanged high silica ZSM5 zeolite (SiO$_2$/Al$_2$O$_3$ of between 10-50) catalyst at a space velocity in the range of 20-80 K hr$^{-1}$; and (c) sequentially exposing the effluent of such zeolite catalyst to an oxidation catalyst.

14 Claims, 2 Drawing Sheets

SELECTIVE REDUCTION OF NO$_x$

BACKGROUND OF THE INVENTION

1. Technical Field

This invention relates to the technology of Purifying exhaust gases or emissions of stationary and mobile sources, and more particularly to the technology of cleansing such emissions of NO$_x$ from an oxygen-rich stream.

2. Discussion of Related Art

Emissions from large scale stationary sources, containing NO$_x$ and excess O$_2$, are generally treated with ammonia as a reductant over a catalyst containing V$_2$O$_5$ on TiO$_2$ (see H. Bosch and F. Janssen, "Catalysis Today", Vol. 2 (4), 1987). Emissions from mobile sources that do not have excess oxygen but contain NO$_x$ (automotive vehicles) are removed by reaction with in-situ reductants, such as carbon monoxide or hydrocarbons (HC), when passed over a catalyst, often containing rhodium Such a catalyst would be ineffective in the presence of a large excess of O$_2$ (see K.C. Taylor, "Automobile Catalyst Converters", Springer, Berlin, 1984).

Recently, copper-exchanged zeolites have been found to reduce NO$_x$ in the presence of excess oxygen (see U.S. Pat. No. 4,934,142 and Japanese patent application publication No. Hei 3-52644, 3/6/91), but to attain substantial conversion efficiencies at the moderate temperatures of an exhaust produced by a lean-burn engine, a temporary rich A/F condition is required to provide a residual HC reductant. Unfortunately, it is not desirable to operate an automotive engine or other emission source under artificially rich conditions simply to facilitate catalytic conversion of the engine emissions (see M. Iwamoto et al, Applied Catalysis, Vol. 69, L 15-19, 1991). To facilitate conversion of NO$_x$ under conditions of excess oxygen, without the need for stimulating high HC in the exhaust, alkane and alkene additions have been suggested as reductants injectable into the emissions ahead of the zeolite (see S. Sato et al, Applied Catalysis, Vol. 70, L 1-5 (1991)). However, it is difficult to meter small doses of such gaseous reductants to match accurately the varying NO$_x$ content of the exhaust gas and to reliably and safely store such gaseous reductants on-board a vehicle.

It is therefore an object of this invention to provide a catalyst system for selective and efficient reduction of NO$_x$ accompanied by excess oxygen by use of a liquid reductant that provides several advantages not attainable by the prior art: (i) the reductant is easy to meter and match to the NO$_x$ variability, (ii) the reductant is nontoxic and safe to store for periodic use, and (iii) the reductant provides substantial enhancement of NO$_x$ conversion over a copper-exchanged zeolite at small excess oxygen conditions.

SUMMARY OF THE INVENTION

In a first aspect, the invention is a catalyst system for selective reduction of gaseous NO$_x$ in the presence of excess oxygen, the system comprising: (a) a copper-containing ZSM5 zeolite to which a NO$_x$-containing gas is exposed; and (b) means for introducing a metered volume of distributed water-soluble, oxygen-containing organic compound into the NO$_x$-containing gas prior to exposure to the Cu-ZSM5 zeolite.

The compounds are partially oxygenated reductants selected from the group consisting of small molecular weight, water soluble alcohols, aldehydes, ketones, and ethers. The oxygenated compounds are capable of providing enhanced conversion efficiency of NO$_x$, particularly at 0.1-0.5% excess oxygen.

Another aspect of the invention is a method of treating automotive exhaust gas emissions, having an excess of oxygen, by the steps comprising: (a) introducing a water-soluble, oxygenated organic compound into the exhaust gas emissions as a reductant and at a location adjacent to the source of the exhaust gas generation; (b) substantially immediately exposing the reductant/emission mixture to a transition metal-exchanged high silica zeolite catalyst (SiO$_2$/Al$_2$O$_3$ of between 10-50) at a space velocity in the range of 20-80 K hr$^{-1}$; and (c) sequentially exposing the effluent of such zeolite catalyst to an oxidation catalyst.

Preferably, the water-soluble, oxygenated compound is introduced by injection of a water/oxygenate solution correlated in an appropriate amount with respect to the NO$_x$ in the instantaneous exhaust gas.

BRIEF DESCRIPTION OF THE DRAWINGS

FIG. 2 shows the effect when using an oxygenated hydrocarbon compound, in this case, propanol.

DETAILED DESCRIPTION AND BEST MODE

Figure 1:
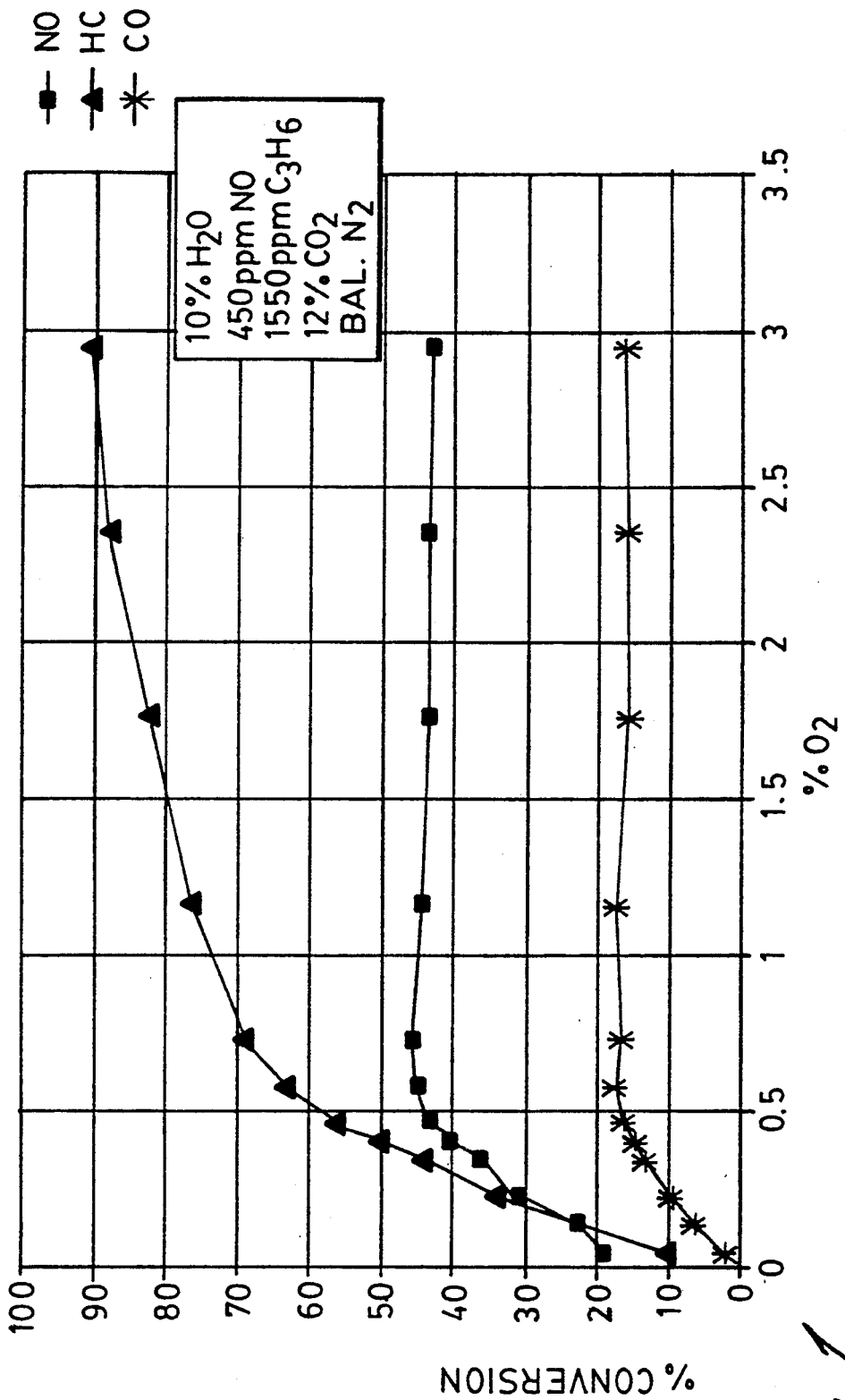
FIGS. 1 and 2 are graphical illustrations of the percent conversion efficiency for reduction of nitric oxide as a function of the percent oxygen in the gas mixture being converted, FIG. 1 using a nonoxygenated reductant (propylene)

The catalyst system of this invention is operative to cleanse the exhaust gas generated by a fossil-fueled engine, particularly a gasoline-fueled internal combustion engine, operated under lean-burn conditions. Lean-burn is generally used herein to mean: for a gasoline engine, an A/F ratio between about 15-23, or a lambda of 1.02-1.7; for a diesel engine, an A/F of between 15.4 and 30, and a lambda of 1.1-2.0; and for a compressed natural gas-fueled vehicle, an A/F ratio of about 17.2-25, and a lambda of about 1.02-1.7.

The catalyst system of this invention comprises essentially (i) a copper ion-exchanged ZSM5 zeolite catalyst, and (ii) means for introducing a metered volume of sprayed water-soluble, oxygen-containing organic compound into an NO$_x$-containing gas mixture prior to exposure to the ZSM5 zeolite.

Zeolites, in general, are aluminosilicates with a framework containing cations such as those of alkali metals and alkaline earth metals. The framework of a zeolite is based on the combination of AlO$_4$+SiO$_4$ tetrahedrons. Only synthetically produced zeolites are suitable for this invention.

ZSM5 is a crystalline zeolite and is disclosed in U.S. Pat. No. 3,702,886, the disclosure of which is incorporated herein by reference. ZSM5 can have a SiO$_2$/Al$_2$O$_3$ ratio ranging from about 10 to 1000. The copper ion-exchanged version of such zeolite may be obtained by stirring a proportion of copper acetate solution (preferably about 0.05M) with the ZSM5 zeolite. The material is filtered, washed, and preferably ion-exchanged three times. It is then dried at about 120° C. for about three hours and calcined at about 600° C. for about three hours. The resulting material will contain copper exchanged for cation(s) of an alkali metal or of a proton of the zeolite as well as copper impregnated onto the zeolite, i.e., about 3% by weight. For instance, the copper ions will replace the sodium ions in the zeolite. The limit is set by the amount of $Al_2O_3$ in the zeolite. It is advantageous to provide as much transition metal (copper) in the zeolite as possible since the amount of copper present in the zeolite is directly related to the catalytic activity of the catalyst. The copper-exchanged zeolite may contain copper in the weight percent range of 1–8% and will be stable up to a temperature of about 600° C. The zeolite catalyst is advantageously coated onto a monolithic or pelleted support which is placed in the exhaust stream to flow therethrough.

The partially oxygenated compound is selected from the group consisting of water soluble alcohols, aldehydes, ketones, and ethers of small molecular weight with more than two carbon atoms, provided that the selected compounds from this class preferably produce $NO_x$ conversion efficiency of at least 40% when the excess oxygen in the gas to be treated varies between 0.1–0.5% (weight percent of oxygen), of at least 35% when the excess oxygen is between 0.5–1.5%, and at least an average of 30% when the excess oxygen is greater than 1.5%. $NO_x$ is used herein to mean NO, $NO_2$, and mixtures thereof. The $NO_x$-containing gas usually contains $NO_x$ in an amount of at least 400 ppm; the gas may also contain water vapor, carbon dioxide, and other combustion products. Specific examples of the partially oxygenated compounds include ethanol, propanol, acetaldehyde, acetone, methyl ethyl ketone, and 1,4-dioxane.

The oxygenated compound, preferably propanol, is metered into the exhaust gas stream immediately ahead of the ZSM5 zeolite, and preferably immediately downstream of the combustion zone for generating the emissions. The metering may be carried out by a suitable injection device, such as a well calibrated injector, to atomize the aqueous solution and achieve a steam/oxygenate mixture at the exhaust gas temperature which is typically about 700°–1100° F. It is desired that appropriate amounts of the oxygenated organic compounds be injected in accordance with the variations of $NO_x$. Present in the exhaust gas. This will usually require a reductant to $NO_x$ ratio of about 3–5. The variability of the $NO_x$ may be instantaneously measured either as a function of exhaust gas temperature or by use of a direct sensor.

The supply of partially oxygenated organic compounds can be stored in plastic or metal canisters. The pressure of such liquid compounds will be around ambient pressure conditions. This mode of storage is considerably simpler than that required for the injection of alternative gaseous reductants and is considerably safer than the use of urea, ammonia, or gaseous reductants.

The method aspect of this invention for treating automotive exhaust gas emissions from a lean-burn fueled engine, having an excess of oxygen, comprises: (a) introducing a water-soluble, partially oxygenated organic compound into the emissions as a reductant and at a location closely adjacent the generating source for said emissions; (b) substantially immediately exposing the reductant/emission mixture to a transition metal-exchanged, high silica zeolite ($SiO_2/Al_2O_3$ ratio between 10–50) catalyst at a compatible space velocity; and (c) sequentially exposing the effluent from the zeolite catalyst to an oxidation catalyst.

The zeolite is of the transition metal exchanged type; the transition metal can be selected from the group consisting of copper, cobalt, nickel, chromium, iron, manganese, silver, zinc, calcium, and compatible mixtures thereof.

The compound is preferably propanol but can be a water soluble, low molecular weight, at least two carbon atom containing hydrocarbon, selected from the group consisting of alcohols, aldehydes, ketones, and ethers. The oxidation catalyst is arranged advantageously to have a space velocity of 20–80 K $hr^{-1}$. The compound is sprayed to provide a reductant/$NO_x$ ratio of about 3–5 and a HC concentration in the emissions of about 4800 ppm.

The oxidation catalyst can be of the $Pt/Al_2O_3$ type or may be a 1% Pd/10% $La_2O_3/al_2O_3$ formulation.

The method results in an enhancement of conversion efficiency at 0.5% $O_2$ for $NO_x$ of at least 42%, for HC of at least 57%, and for CO of at least 12%.

Flow reactor studies were carried out to corroborate the scope of this invention. Catalyst samples were prepared using a cylindrical cordierite monolithic substrate (400 cells/$inch^2$, 1" diameter, 1.5" length) coated with 17% by weight of a washcoat consisting of 85% ZSM5 zeolite and 15% alumina. The ZSM5 had a silica/alumina ratio of 30. This sample was ion-exchanged in a 0.05M copper-acetate solution overnight, washed in distilled water, and then calcined in 5% oxygen. The samples were analyzed by x-ray fluorescence and found to have a total copper loading of 1.6% by weight.

Two sets of experiments were conducted. The first series consisted of characterizing the extent of reaction between NO and various oxygenated hydrocarbons, and comparing these to the NO-propene reaction used as a baseline test. The second series of tests characterized the effect of oxygen on both the NO-propene and the NO-propanol reactions.

For the first series, the sample was tested in a quartz flow reactor under the following steady-state conditions: space velocity 50,000 $hr^{-1}$; temperature 482° C.; base gas blend 12% $CO_2$, 10% $H_2O$, 3.9% $O_2$, 450 ppm NO, reductant (stoichiometric equivalent of 1620 ppm $C_3H_6$), balance $N_2$ (no $SO_2$ present).

As shown in Table I, the reductants included a variety of alcohols, ethers, aldehydes, and ketones. Baseline runs using 1620 ppm $C_3H_6$ (not an oxygenated hydrocarbon) as the reductant were used for calibration to confirm that no change in activity had occurred throughout the experiment. When using other hydrocarbons, the concentration was adjusted so as to be the stoichiometric equivalent of this concentration of propylene. The oxygenated compounds selected, all water soluble, were injected from aqueous solutions into the gas stream, as a steam/oxygenate mixture. Downstream of the reaction, water vapor was extracted by two condensers before sample gases entered the analytical train, and in the condensation process the unreacted water soluble oxygenates were likewise trapped out. For this reasons, it was not possible to analyze the post-catalyst oxygenate concentrations and hydrocarbon conversions are therefore given for the baseline $C_3H_6$ runs only. Results given in Table I show that low molecular weight, water soluble HC's tested with two or more carbon atoms all provided a satisfactory conversion efficiency for $NO_x$, at an extremely high oxygen content, which was within 15% of the propylene reductant.

The second series of tests were also conducted on the above flow reactor under the following steady-state conditions: space velocity 50,000 $hr^{-1}$; temperature 482° C.; base gas blend 12% $CO_2$, 10% $H_2O$, 450 ppm NO, reductant (either 1620 ppm propanol or 1620 ppm C3H6), balance N2 (no SO2 present). Oxygen concentration was varied between approximately 0–4%. Results are given in FIGS. 1 and 2.

Water soluble, partially oxygenated reductants were employed; representative compounds of the most common classes: alcohols—methanol, ethanol, propanol; aldehydes—acetaldehyde; ketones—acetone, methyl ethyl ketone; ethers—1,4-dioxane. The conditions described in the experimental section were dictated by the perceived conditions of practical exploitation, either in use for stationary source $NO_x$ abatement or for lean-burn combustion automotive use, hence the large oxygen excess of 3.9%. This amount of oxygen exceeded by approximately two orders of magnitude the NO to be reduced. The concentration of reductant was determined empirically at a level where its further increase does not affect NO conversion. This is a bit more than a thirty-fold excess needed to reduce the NO and, conversely, the oxygen/reductant ratio is approximately five. The conversion of the reductant, as seen in the case of propylene, is 95%. The conversion in the case of the partially oxygenated reductants was not measured, but a similar temperature rise of approximately 35° C. measured at the catalyst inlet attests that it is comparable to that of propylene. The four base runs with propylene are quite reproducible both with respect to its own oxidation and to the NO conversion.

None of the partially oxidized reductants were quite as proficient in NO conversion as propylene itself at very large oxygen excess, although propanol came very close (34% versus an average of 39% for the four runs with propylene). Methanol was completely inactive for NO reduction. The temperature rise when using methanol was comparable to that of other reductants showing that it was itself oxidized by the oxygen present. All the other compounds with more than two carbon atoms gave NO conversions of 25-30%.

Figure 2:
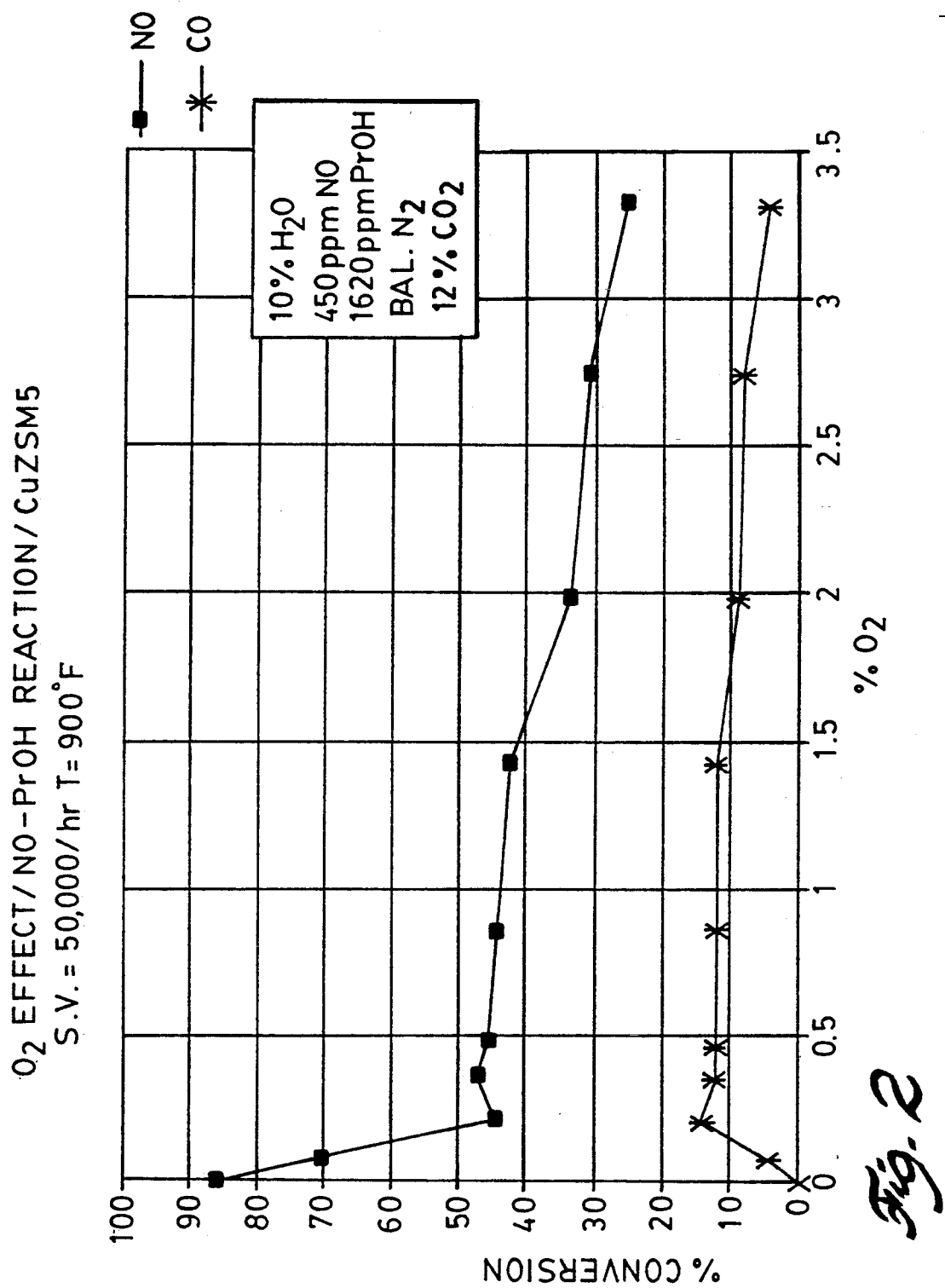

Data from these experiments are plotted in FIGS. 1 and 2. $NO_x$ and hydrocarbon conversions are based on the disappearance of the respective species, and conversion to CO is defined as the percentage of the inlet carbon in the reductant. Propylene is used in FIG. 1, and propanol in FIG. 2. FIG. 1 demonstrates the initial acceleration of the $NO_x$ reduction reaction by the addition of small amounts of oxygen. FIG. 2, however, shows the exact opposite behavior in the $NO_x$ reduction. In the case of propanol, the initial addition of small concentrations of oxygen drastically inhibits the reduction of $NO_x$. This is not unreasonable if the oxygenated species is indeed an active intermediate in the $NO_x$ reduction over Cu-ZSM5. With the addition of further oxygen, the difference between propylene and propanol becomes less. At a large excess of oxygen (>3.0%), the selectivity of $NO_x$ reduction is somewhat subdued by oxygen in the case of the partially oxygenated reductant/propanol. The data indicate conclusively that the use of water-soluble reducing agents provides a superior mode of operation under certain automotive operating conditions, i.e., excess $O_2$ of 0.1-0.5%.

TABLE I

| Reductant | Reductant in (as ppm C) | Reductant out (as ppm C) | % Conv. | NO in ppm | NO out ppm | % Conv. |
|---|---|---|---|---|---|---|
| C3H6 | 4790 | 65 | 98.7 | 454 | 281 | 38.1 |
| Methanol | 4860 | — | — | 480 | 479 | 0.2 |
| Ethanol | 4860 | — | — | 470 | 354 | 24.7 |
| C3H6 | 4941 | 162 | 96.7 | 470 | 300 | 36.2 |
| Propanol | 4860 | — | — | 486 | 322 | 33.7 |
| Acetaldehyde | 5832 | — | — | 490 | 351 | 28.3 |
| C3H6 | 4957 | 297 | 94.0 | 477 | 273 | 42.8 |
| Acetone | 5468 | — | — | 480 | 342 | 28.7 |
| Methyl Ethyl Ketone | 5303 | — | — | 459 | 331 | 27.8 |
| C3H6 | 4860 | 110 | 93.2 | 450 | 270 | 40.0 |
| 1,4-Dioxane | 5832 | — | — | 473 | 351 | 25.7 |

Note - successive day's runs are grouped within thick horizontal lines.

We claim

1. A catalyst system for selective reduction of gaseous $NO_x$ in the presence of excess $O_2$, comprising:
    (a) a copper ion-exchanged ZSM5 zeolite body to which a $NO_x$-containing gas is exposed; and
    (b) means for introducing a metered liquid volume of distributed water soluble, oxygen-containing organic compound into such gas prior to exposure to said zeolite.

2. The system as in claim 1, in which said oxygen-containing organic compound, introduced by means (b), is selected from a group consisting of alcohols, aldehydes, ketones, and ethers, provided they preferably produce a minimum conversion efficiency of at least 40% when excess $O_2$ varies between 0.1-0.5%, of at least 35% when excess $O_2$ is 0.5-1.5%, and at least an average of when $O_2$ is greater than 1.5%.

3. The system as in claim 2, in which said compound is a low molecular weight compound selected from said group.

4. The system as in claim 1, in which said $NO_x$-containing gas additionally contains combustion by-products.

5. The system as in claim 4, in which said gas contains $NO_x$ in an amount of about 400 ppm.

6. The system as in claim 1, in which said zeolite has an $SiO_2/Al_2O_3$ ratio of 10-1000, and the copper is exchanged to a substantially maximum amount.

7. The system as in claim 1, in which said zeolite contains copper in a weight amount of 1-8%.

8. The system as in claim 1, in which said means (b) comprises an injector of a finely sprayed aqueous solution containing said oxygen-containing organic compound, said solution being introduced to provide a ratio of oxygen/reductant of about 5.

9. The system as in claim 1, in which said means (b) introduces said compound in a reductant to $NO_x$ ratio of about 3-5.

10. The system as in claim 1, in which said means (b) draws said liquid compound from an ambient pressure storage canister.

11. The system as in claim 1, in which said $NO_x$-containing gas is the emission stream from a fossil-fueled internal combustion engine, and means (b) controls the injection of said water soluble organic compound as a function of the variance of $NO_x$ in such stream in a predetermined ratio.

12. The system as in claim 11, in which said means (b) control is carried out by use of a $NO_x$ sensor in said stream.

13. The system as in claim 1, in which said oxygen-containing compound is propanol.

14. The system as in claim 1, in which said oxygen-containing organic compound is a low molecular weight water soluble hydrocarbon selected from within the group consisting of alcohols, aldehydes, ketones, and ethers.

* * * * *